July 20, 1965 A. I. SWARTZ 3,196,325

ELECTRODE CONNECTION TO MESA TYPE SEMICONDUCTOR DEVICE

Filed Feb. 16, 1960

INVENTOR.
ALLEN I. SWARTZ

BY [signature]

ATTORNEY

United States Patent Office 3,196,325
Patented July 20, 1965

3,196,325
ELECTRODE CONNECTION TO MESA TYPE SEMICONDUCTOR DEVICE

Allen I. Swartz, Malden, Mass., assignor to Microwave Associates, Inc., Burlington, Mass., a corporation of Massachusetts Filed Feb. 16, 1960, Ser. No. 9,016
9 Claims. (Cl. 317—234)

This invention relates in general to electronic semiconductor devices, and more particularly to such devices of the type characterized by a "mesa" or similar protuberance via which an electrical connection is made to a body of semiconductor material.

In the fabrication of mesa-type and similar semiconductor devices, one of the main problems is that of making an electrical contact to the mesa or other protuberance, which is small and protrudes only a few thousandths of an inch above the relatively larger area of a surface of the remainder of the semiconductor body. To make this contact with a minimum of inductance and with a minimum requirement for positioning accuracy, it is usual to employ a flexible electrode in the form of a spring or diaphragm with a relatively flat area, which is considerably larger than the area of the proturberance, to make electrical contact therewith. A danger exists, however, that unless the surface of the semiconductor body on which the protuberance is disposed and the confronting area of the flexible electrode are maintained parallel or at least nearly parallel to each other, the flexible electrode will become short circuited to the surface of the main semiconductor body, and will thereby short circuit the semiconductor junction. Heretofore, it has required great pains to insure such parallelism.

The dimensions involved are, for example:

A line across the surface on which the protuberance is disposed may be of the order of 0.030 inch, while the parallel dimension of a mesa may be of the order of 0.003 or 0.004 inch; and The projection of the mesa above this surface may be approximately 0.002 inch.

It is, therefore, clear that a flat electrode intended for making electrical contact to the top of a mesa or similar protuberance must be very accurately positioned in order to avoid also making contact with the adjacent surface of the semiconductor body. In addition, this contact frequently must be made within a tubular housing, the internal diameter of which is only slightly greater than the maximum diameter of the semiconductor body and the length of which is of the order of ¼ of an inch overall, and all this must be done in a way which permits the making of a hermetic seal.

It is an object of this invention to improve the manufacturing yield of semiconductor devices of the aforementioned types by substantially eliminating the danger of short circuiting between the semiconductor body and the mesa or other protuberance contacting electrode or electrodes. It is another object of the invention to achieve such improvement in a simple, reliable, and economical fashion without sacrifice of any desirable electrical characteristic. Another object is to provide an improved semiconductor of the mesa and similar type construction, in which the chances of short circuiting the semiconductor junction during use or handling is substantially eliminated. It is another object of the invention to provide such semiconductor devices in which positioning accuracy requirements are drastically reduced.

According to the present invention, an insulator, preferably in the form of a flat apertured body of dielectric material, is disposed between the flat face of the electrode which contacts the protuberance and the surface of the semiconductor body on which the protuberance is disposed. This insulator is preferably of such a thickness that the protuberance extends through the aperture in it, in order to avoid interfering with the desired electrical contact between the protuberance and the electrode connected to it. The insulator according to the invention introduces no noticeable reactive effect into the semiconductor device, as compared with a device which does not have the present improvement. In order to simplify inclusion of the invention in the assembly process of semiconductor devices, the insulator is preferably made in the form of a flat apertured body of a stiff material, such as electrical grade mica, and its outer periphery is shaped and dimensioned to fit snugy within the hermetically sealed housing of the device. The aperture of the insulator can be larger than the dimensions of the protuberance in the same plane, since the hazard from short circuit is greatest at points where the edges of the protuberance contacting electrode can come close to the confronting flat surface of the semiconductor body. According to the invention, it is also possible to use a soft material such as Teflon, or an insulating paint or varnish, for the insulator.

Other and further objects and features of the invention, as well as the best known mode to apply it, will be explained with reference to preferred embodiments which are illustrated in the accompanying drawing wherein.

Figure 1:
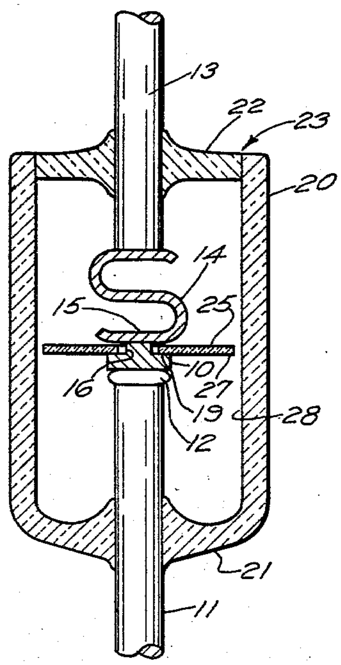
FIG. 1 is a vertical section through a mesa diode construction according to the invention.

Referring now to FIG. 1, the diode there shown comprises a semiconductor body 10 of the mesa type mounted on a first terminal electrode 11 by means of a suitable solder 12. The second terminal electrode 13 of the diode has at the inner end an S-shaped spring contact 14 with a flat portion 15 which serves as a flexible electrode adapted to be in contact with the top of the mesa portion 16 of the body 10.

Figure 3:
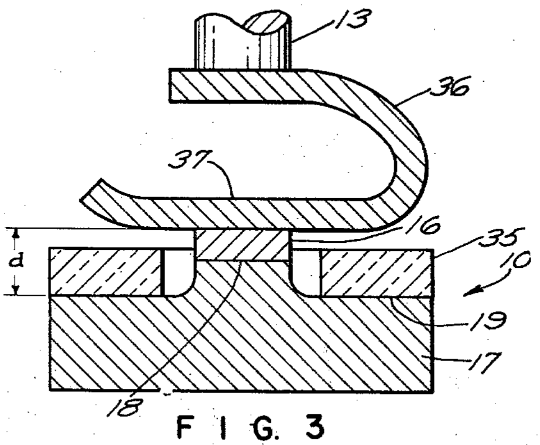
FIG. 3 is a partial section through another mesa diode incorporating the invention.

Referring to FIG. 3 which shows a mesa-type diode semiconductor body in greater detail, the body 10 comprises a base portion 17 and a mesa portion 16. A semiconductor junction 18 is contained within the mesa portion. The junction 18 is substantially parallel to the upper surface 19 of the base 17 on which the mesa 16 is disposed. The mesa 16 has a diameter, or other dimension parallel to the surface 19, which is much smaller than the corresponding parallel dimension of the base 17, and protrudes from the surface 19 a distance which, as mentioned above, may be about 0.002 inch.

Referring again to FIG. 1 the mesa-contact electrode 15 has a possible contact area confronting the mesa 16 which is larger than the surface of the mesa. Since the mesa itself rises only a distance of the order of 0.002 inch above the surface 19, and it will be appreciated that unless the terminal electrodes 11 and 13 are maintained in almost exact collinear relation it is easily possible for the mesa-contact electrode 15 to come in contact with the surface 19 of the base 17 while at the same time being in contact with the top of the mesa 16. This is illustrated in FIG. 1 in connection with glass diodes, for example, of the kind designed for computer and similar applications in which there is a glass housing 20 of tubular form, sealed to the first terminal electrode 11 at one end 21 and closed at the other end by a glass bead 22 which is initially sealed to the second terminal electrode 13. In the assembly of such diodes the glass bead 22 is fused to the housing 20 at a junction 23 and at the same time the second terminal electrode 13 is pushed toward the first terminal electrode 11, to make contact between the mesa-contact electrode 15 and the confronting surface of the mesa 16. It is during this operation that critical handling of the electrodes is necessary in order to prevent short circuiting of the mesa-contact electrode 15 on the confronting surface 19 of the base 17. The use of the flexible mesa-contact electrode 15 which is large relative to the mesa 16 is desired to reduce the requirement for strigent positioning accuracy. Diode devices of the kind shown in FIG. 1 are frequently so small, usually on the order of ⅛ inch in external diameter over all and ¼ inch long throughout the entire length of the housing 20, that it would be virtually impossible to make contact with the mesa 16 in any kind of hand operation unless the mesa-contact electrode 15 were sufficiently large to assure contact; it is this larger size of the electrode 15, however, which contributes to the danger of mechanical short circuiting from the top of the mesa 16 to the top surface 19 of the base 17.

Figure 2:
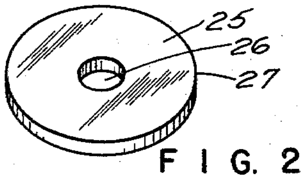
FIG. 2 is an oblique view of the insulator in FIG. 1.

According to the present invention, this danger of mechanical short circuiting is substantially completely eliminated by the employment of an electrical insulator 25 between the surface 19 and the mesa-contact electrode 15. As is shown in greater detail in FIG. 2, the insulator is annular in form and has an aperture 26 the diameter or cross-sectional dimensions of which may be considerably larger than the corresponding dimensions in the same plane of the mesa 16. It is only required of the aperture 26 that it be large enough for the mesa 16 to protrude through the insulator 25 when the insulator is in place on the surface 19 of the base 17, as is shown in FIG. 1. The insulator 25 covers the surface 19 over all areas where it is possible for the mesa-contact electrode 15 to come in contact with the surface 19. As will be appreciated, the danger of such contact is greater near the outer edges of the surface 19 than in the regions of that surface close to the mesa 16. In order to make it possible to position the insulator 25 without difficulty, the outer periphery 27 thereof is preferably of the same shape and approximately the same size as the inner peripheral dimensions 28 of the housing 20. When the dimensions of the insulator 25 are considered, the value of this provision will be fully appreciated. The insulator 25 in a diode having ⅛ inch outer housing diameter will have a diameter somewhat less than 0.006, or ⁶⁄₁₀₀₀, inch. The thickness of the insulator 25 is of the order of 0.001 inch, so that the mesa 16 can protrude approximately 0.001 inch through it when the insulator is at rest on the surface 19 of the base 17. The perforation 26 is approximately 0.008 inch in diameter.

It has been found that an electrical grade of mica is a suitable material for use in the insulator 25 for many reasons. A suitable dielectric should be serviceable at high temperatures, should have low loss characteristics, and should be relatively inexpensive. Furthermore, it should be stiff enough for handling in the assembly process of a device according to FIG. 1. A sheet of such mica which is 0.001 inch thick has these characteristics, and through insulators made of it may be small, they can be handled by persons who are skilled in assembling semiconductor devices and will remain in position as shown in FIG. 1 while the second terminal electrode 13 and the spring contact 14 are moved about until the mesa-contact electrode 15 makes suitable contact with the mesa 16. This structure makes it possible to achieve such contact, with elimination of the danger of mechanically short circuiting the semiconductor junction 18, and assurance that the insulator 25 will remain in place surrounding the mesa 16 while the assembly operation is being completed, so that full advantage may be taken of the relief from positioning accuracy requirements which is afforded by use of an enlarged mesa-contact electrode 15. Thereafter, the insulator 25, if made of a suitably inert and low loss (e.g., electrical grade mica) material, has no deleterious electrical effects.

As is shown in FIG. 3, a soft insulator 35 which covers only the top surface 19 of the base 17 can be used if desired. In this case the insulator can be made of a soft material having the above-mentioned desired electical characteristics. A plastic material known as "Teflon" has been successfully used. Also the spring contact can be in the form of a C-spring 36, of which a long and comparatively flat mesa-contact portion 37 is employed as the flexible electrode to make contact with the mesa 16. The C-spring is mounted at the end of the second electrode 13 in place of the S-spring 14 of FIG. 1. It will be further appreciated that the semiconductor body 10 need not be mounted at the end of a long terminal electrode like electrode 11, but can be disposed in housings of other designs suitable for use in the manufacture of mesa-type semiconductor diodes, if desired. For example, the body 10 can be attached directly to a metal cup-shaped base which in turn is hermetically sealed at its periphery to a glass bead like the glass bead 22 mounting the second terminal electrode 13. These construction are not shown because they are well known in the art and are not part of the present invention.

The present invention makes it possible to avoid the use of cement by providing an insulator which in certain embodiments is in the form of a flat apertured body which will remain in place during assembly operations and which cannot leave its place thereafter, as is apparent from an inspection of both FIGS. 1 and 3.

Figure 4:
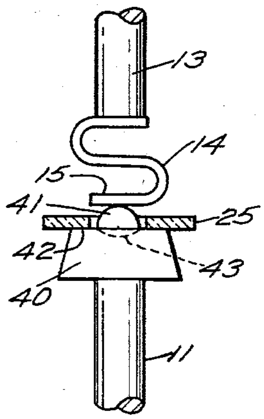
FIG. 4 is a partial side view, with the insulator in section, of a third mesa diode incorporating the invention.

FIG. 4 illustrates the invention as applied to another junction type of semiconductor diode in which a semiconductor body 40, of silicon, for example, has a generally hemispherical protuberance 41, made for example of aluminum, disposed on its upper surface 42. The semiconductor junction 43 (represented by a dotted line) is in the body 40 of semiconductor material. The remaining elements are similar to corresponding elements of FIG. 1, and bear like reference characters.

Figure 5:
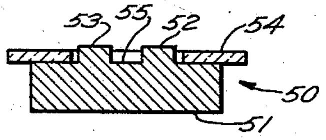
FIGS. 5 and 6 illustrate the invention as applied to a three-terminal transistor.
Figure 6:
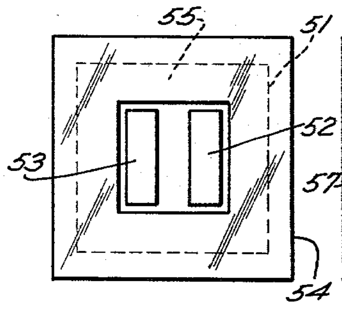
Figure 7:
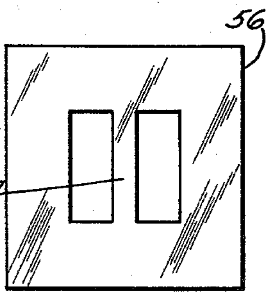
FIG. 7 is a modification of the insulator shown in FIG. 6.

FIGS. 5 and 6 show a semiconductor body 50 having a base 51 and two mesas 52 and 53, each similar to the mesa 16 of FIG. 1. The body 50 is intended for use in a three-terminal transistor, in which base, emitter and collector electrodes will be employed. An insulator 54, made for example of an electrical grade mica, like the insulator 25 in FIG. 1 prevents mechanical short circuiting between the top of either mesa 52 or 53 and the top surface 55 of the base 51. This embodiment of the insulator has no part covering the top surface 55 between the mesas 52 and 53, but if the spacing between the mesas is sufficiently large so that a mesa contact electrode (not shown) can touch one of the mesas and the region of the top surface 55 between them, an insulator 56, having a central stem portion 57 according to FIG. 7 can be used. The stem portion will cover the portion of the top surface 55 which is between the mesas 52 and 53. While the semiconductor body, mesas, insulators and apertures in the insulators in FIGS. 5, 6 and 7 have been shown as rectangular, it will be appreciated that these elements may have round or other configurations.

It will be further understood that while insulators according to the invention have been shown and described herein as separate elements, for some applications an insulator made of a suitable liquid, such as a varnish may be used if desired, in which case it will be applied, as with a brush, to the top surface of the base which it is desired to insulate.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Semiconductor diode of the mesa type, comprising a semiconductor body having a base portion which has a substantially flat surface, and projecting a first distance from an intermediate portion of said surface a mesa portion, a semiconductor junction disposed substantially parallel to said surface, a first elongated electrical conductor affixed to said base portion at the side thereof opposite to said flat surface and extending away from said base portion in a direction substantially perpendicular to said flat surface, a hollow electrically nonconductive housing member attached via a first end closure portion to said first conductor and extending therefrom to surround said semiconductor body, a second end closure portion completing said housing and supporting therethrough a second elongated electrical conductor disposed collinear to said first elongated conductor and having one end extending toward said mesa portion, an elongated flexible electrode affixed at one end to said one end of said second elongated conductor and having a contact portion including the other end of said flexible electrode extending substantially parallel to said flat surface disposed to contact the top of said mesa portion with an intermediate portion of said contact portion, and flat apertured electrical insulator means having a thickness less than said first distance overlying substantially all of said flat surface surrounding said mesa portion and interposed between said flat surface and said contact portion of said flexible conductor, with said mesa portion extending beyond said insulator means toward said contact portion, to prevent said contact portion from touching said flat surface when said contact portion is in contact with said mesa portion, whereby when said diode is assembled by a process which includes the step of bringing said first and second elongated conductors toward each other to bring said contact portion of said flexible electrode into contact with said mesa portion said insulator means prevents electrical contact between said flexible electrode and said flat surface and does not interfere with an electrical contact between said flexible electrode and said mesa portion.

2. Semiconductor diode of the junction type, comprising a semiconductor body having a base portion, a protuberance projecting from an intermediate portion of a substantially flat surface thereof, a semiconductor junction substantially parallel to said surface, means providing an electrical connection to said base portion, a flexible electrode having a generally flat and flexible contact portion extending substantially parallel to and spaced from said surface of said base portion disposed to contact said protuberance on the outer side thereof remote from said flat surface, said contact portion extending beyond the periphery of said outer side to overlie said surface of said base portion, and flat annular electrical insulator means having a thickness which is less than the height of said protuberance measured from said surface of said base portion to said outer side overlying substantially all of said flat surface surrounding said protuberance and disposed between said flat surface and said electrode, whereby when said electrode is brought into contact with said protuberance said insulator means prevents electrical contact between said flat surface and said electrode without preventing electrical contact between said electrode and said outer side.

3. Diode according to claim 2 including a hollow cylindrical housing member surrounding said body and said electrode.

4. Diode according to claim 3 in which said insulator means extends into peripheral contact with the inner surface of said housing.

5. Semiconductor device of the junction type, comprising:

a semiconductor body having a base portion;
a protuberance disposed on a surface thereof;
a semiconductor junction between the outer surface of said protuberance and said base portion;
means providing an electrical connection to said base portion;
a flexible electrode having a generally flat and flexible contact portion extending substantially parallel to and spaced from said surface of said base portion disposed to contact said outer surface of said protuberance;
said contact portion extending beyond the periphery of said outer surface of said protuberance to overlie said surface of said base portion; and
electrical insulator means overlying said surface of said base portion around said protuberance and interposed between said surface of said base portion and said electrode;
said insulator means being an apertured sheet of electrical grade mica;
the thickness of said insulator means being less than the height of said protuberance measured from said surface of said base portion to said outer surface of said protuberance;
whereby when said electrode is brought into contact with said outer surface of said protuberance said insulator means prevents electrical contact between said surface of said base portion and said electrode without preventing electrical contact between said electrode and said outer surface.

6. Semiconductor device of the junction type, comprising:

a semiconductor device having a base portion;
a protuberance disposed on a surface thereof;
a semiconductor junction between the outer surface of said protuberance and said base portion;
means providing an electrical connection to said base portion;
a flexible electrode having a generally flat and flexible contact portion extending substantially parallel to and spaced from said surface of said base portion disposed to contact said outer surface of said protuberance;
said contact portion extending beyond the periphery of said outer surface of said protuberance to overlie said surface of said base portion; and
electrical insulator means overlying said surface of said base portion around said protuberance and interposed between said surface of said base portion and said electrode;
said insulator means being an apertured sheet of a soft insulating material;
the thickness of said insulator means being less than the height of said protuberance measured from said surface of said base portion to said outer surface of said protuberance;
whereby when said electrode is brought into contact with said outer surface of said protuberance said insulator means prevents electrical contact between said surface of said base portion of said electrode without preventing electrical contact between said electrode and said outer surface.

7. Diode according to claim 4 in which said flat annular insulator means is a perforated sheet of a substantially stiff material.

8. Semiconductor transistor of the junction type, comprising a semiconductor body having a base portion, first and second protuberances disposed in separate locations on a surface thereof, a semiconductor junction between the outer surface of each protuberance and said base portion, electrical insulator means overlying said surface of said base portion around said protuberances to insulate said surface of said base portion from an electrode contacting the outer surface of either of said protuberances, the thickness of said insulator means being less than the height of said protuberances on said base portion, and flexible electrode means having a generally flat contact portion in contact with the outer surface of each protuberance extending substantially parallel to and spaced from said surface of said base portion and extending beyond said outer surface to overlie said surface of said base portion.

9. Transistor according to claim 8 in which said insulator means includes a portion overlying said surface of said base portion between said protuberances.

References Cited by the Examiner

UNITED STATES PATENTS

| | | | |
|---|---|---|---|
| 2,890,395 | 6/59 | Lathrop et al. | 317—234 |
| 2,937,960 | 5/60 | Pankove | 148—1.5 |
| 2,972,092 | 2/61 | Nelson | 317—235 |
| 2,981,877 | 4/61 | Noyce | 317—235 |

DAVID J. GALVIN, *Primary Examiner*.

SAMUEL BERNSTEIN, BENNETT G. MILLER, GEORGE N. WESTBY, *Examiners*.